United States Patent
Badr

(10) Patent No.: US 11,720,238 B2
(45) Date of Patent: Aug. 8, 2023

(54) SELECTING AN INPUT MODE FOR A VIRTUAL ASSISTANT

(71) Applicant: Google LLC, Mountain View, CA (US)

(72) Inventor: Ibrahim Badr, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/496,881

(22) Filed: Oct. 8, 2021

(65) Prior Publication Data
US 2022/0027030 A1    Jan. 27, 2022

Related U.S. Application Data

(63) Continuation of application No. 15/981,536, filed on May 16, 2018, now Pat. No. 11,169,668.

(51) Int. Cl.
*G06F 3/16* (2006.01)
*G06F 3/0484* (2022.01)
(Continued)

(52) U.S. Cl.
CPC .......... *G06F 3/0484* (2013.01); *G06F 3/0481* (2013.01); *G06F 3/167* (2013.01); *H04M 1/72454* (2021.01); *H04M 1/72457* (2021.01)

(58) Field of Classification Search
CPC .......................... G06F 3/048–05; G06F 3/167
See application file for complete search history.

(56) References Cited

U.S. PATENT DOCUMENTS

| | | | |
|---|---|---|---|
| 6,012,030 A * | 1/2000 | French-St. George | H04M 1/72448 704/275 |
| 6,570,555 B1 * | 5/2003 | Prevost | G06F 3/038 345/156 |

(Continued)

FOREIGN PATENT DOCUMENTS

| | | |
|---|---|---|
| EP | 2940556 | 11/2015 |
| JP | 2015/135764 | 7/2015 |

(Continued)

OTHER PUBLICATIONS

International Preliminary Report on Patentability for Application No. PCT/US2019/031969, dated Nov. 26, 2020, 8 pages.
(Continued)

*Primary Examiner* — Daniel Rodriguez
(74) *Attorney, Agent, or Firm* — Dority & Manning, P.A.

(57) ABSTRACT

Methods, systems, and apparatus for selecting an input mode are described. In one aspect, a method includes receiving request data specifying a request to launch a virtual assistant application from a lock screen of a mobile device. In response to receiving the request data, input signals are obtained. A selection of an input mode for the virtual assistant application is made, from candidate input modes, based on the input signals. Each candidate input mode is of an input type different from each other input type of each other candidate input mode. The input types include an image type and an audio type. The input mode of the image type receives pixel data for input to the virtual assistant application. The input mode of the audio type receives audio input for the virtual assistant application. The virtual assistant application presents content selected based on input signals received using the selected input mode.

20 Claims, 4 Drawing Sheets

(51) Int. Cl.
*G06F 3/0481* (2022.01)
*H04M 1/72454* (2021.01)
*H04M 1/72457* (2021.01)

(56) References Cited

U.S. PATENT DOCUMENTS

| | | | |
|---|---|---|---|
| 6,727,921 B1 | 4/2004 | Valad | |
| 6,779,060 B1* | 8/2004 | Azvine | G06F 9/451 |
| | | | 710/37 |
| 8,788,257 B1* | 7/2014 | Su | G06F 40/20 |
| | | | 704/4 |
| 9,159,116 B2* | 10/2015 | Plagemann | G06F 3/005 |
| 9,261,966 B2* | 2/2016 | Berestov | G06F 3/0304 |
| 9,519,355 B2* | 12/2016 | Devries | G06F 3/0304 |
| 10,254,879 B1* | 4/2019 | Oral | G06F 3/0446 |
| 2002/0135618 A1* | 9/2002 | Maes | G06V 40/165 |
| | | | 715/767 |
| 2005/0136897 A1 | 6/2005 | Praveenkumar et al. | |
| 2005/0144187 A1* | 6/2005 | Che | G10L 15/26 |
| | | | 704/E15.044 |
| 2005/0256717 A1* | 11/2005 | Miyata | G10L 15/1822 |
| | | | 704/E15.026 |
| 2005/0278467 A1* | 12/2005 | Gupta | G06F 3/038 |
| | | | 710/65 |
| 2007/0100635 A1 | 5/2007 | Mahajan et al. | |
| 2007/0255468 A1* | 11/2007 | Strebel | B60N 2/002 |
| | | | 701/49 |
| 2008/0221893 A1* | 9/2008 | Kaiser | G10L 15/24 |
| | | | 704/E15.005 |
| 2009/0292687 A1* | 11/2009 | Fan | G06N 5/02 |
| | | | 707/999.005 |
| 2010/0121636 A1* | 5/2010 | Burke | G10L 25/78 |
| | | | 704/E15.04 |
| 2010/0145971 A1 | 6/2010 | Cheng et al. | |
| 2011/0179864 A1* | 7/2011 | Raasch | G11B 19/042 |
| | | | 73/493 |
| 2012/0117051 A1* | 5/2012 | Liu | G06F 16/90335 |
| | | | 707/707 |
| 2012/0121185 A1* | 5/2012 | Zavesky | G06F 3/017 |
| | | | 715/863 |
| 2012/0133664 A1* | 5/2012 | Zhu | G06T 11/001 |
| | | | 345/582 |
| 2012/0296646 A1* | 11/2012 | Varthakavi | G10L 15/26 |
| | | | 704/235 |
| 2012/0324213 A1* | 12/2012 | Ho | G06F 3/011 |
| | | | 713/100 |
| 2013/0108994 A1* | 5/2013 | Srinivasa | G06F 40/44 |
| | | | 434/156 |
| 2013/0204813 A1 | 8/2013 | Master et al. | |
| 2013/0211841 A1* | 8/2013 | Ehsani | G10L 21/00 |
| | | | 704/270.1 |
| 2013/0222271 A1* | 8/2013 | Alberth | G06F 3/0304 |
| | | | 345/173 |
| 2013/0234945 A1* | 9/2013 | Goktekin | G06F 3/04883 |
| | | | 345/168 |
| 2013/0265437 A1* | 10/2013 | Thorn | G02B 27/017 |
| | | | 348/E5.09 |
| 2013/0275875 A1* | 10/2013 | Gruber | G06F 3/167 |
| | | | 715/728 |
| 2013/0282363 A1* | 10/2013 | Fan | G09B 7/00 |
| | | | 704/9 |
| 2013/0283168 A1* | 10/2013 | Brown | G06F 3/165 |
| | | | 715/728 |
| 2013/0329041 A1* | 12/2013 | Schatzberg | G01S 17/06 |
| | | | 348/136 |
| 2014/0007115 A1* | 1/2014 | Lu | G06F 3/048 |
| | | | 718/102 |
| 2014/0028826 A1* | 1/2014 | Lee | G10L 15/25 |
| | | | 348/77 |
| 2014/0067373 A1* | 3/2014 | Wasserblat | G10L 15/02 |
| | | | 704/9 |
| 2014/0111420 A1* | 4/2014 | Ahn | G06F 3/0484 |
| | | | 345/156 |
| 2014/0132505 A1* | 5/2014 | Vennelakanti | G06F 3/011 |
| | | | 345/156 |
| 2014/0139637 A1* | 5/2014 | Mistry | G06F 3/0304 |
| | | | 348/46 |
| 2014/0232633 A1* | 8/2014 | Shultz | H04W 12/06 |
| | | | 345/156 |
| 2014/0244266 A1* | 8/2014 | Brown | G06F 3/167 |
| | | | 715/764 |
| 2014/0245140 A1* | 8/2014 | Brown | G06Q 30/0601 |
| | | | 715/708 |
| 2014/0258857 A1* | 9/2014 | Dykstra-Erickson | G06F 3/038 |
| | | | 715/708 |
| 2014/0267911 A1* | 9/2014 | Grant | H04N 21/8133 |
| | | | 348/563 |
| 2015/0052431 A1* | 2/2015 | Zhu | G06F 3/04883 |
| | | | 715/802 |
| 2015/0070251 A1* | 3/2015 | Kim | G06F 3/165 |
| | | | 345/8 |
| 2015/0088923 A1* | 3/2015 | Garcia-Barrio | G06F 16/243 |
| | | | 707/769 |
| 2015/0148011 A1* | 5/2015 | Chen | H04W 4/12 |
| | | | 455/412.2 |
| 2015/0185996 A1* | 7/2015 | Brown | G06F 3/04817 |
| | | | 715/706 |
| 2015/0189178 A1* | 7/2015 | Lombardi | H04N 23/63 |
| | | | 348/207.99 |
| 2015/0193005 A1* | 7/2015 | Di Censo | G10L 17/22 |
| | | | 345/156 |
| 2015/0222742 A1* | 8/2015 | Son | H04B 1/385 |
| | | | 455/566 |
| 2015/0309561 A1* | 10/2015 | Stewart | G06F 3/01 |
| | | | 345/156 |
| 2015/0347848 A1* | 12/2015 | Gurovich | G06V 20/20 |
| | | | 382/104 |
| 2015/0363047 A1* | 12/2015 | Mathur | G06F 3/0482 |
| | | | 715/710 |
| 2016/0019240 A1 | 1/2016 | Hammontree et al. | |
| 2016/0062473 A1* | 3/2016 | Bouchat | G06F 3/011 |
| | | | 345/156 |
| 2016/0071517 A1* | 3/2016 | Beaver | G06F 40/35 |
| | | | 704/9 |
| 2016/0085430 A1* | 3/2016 | Moran | H04M 1/72454 |
| | | | 715/765 |
| 2016/0086029 A1* | 3/2016 | Dubuque | G06V 20/63 |
| | | | 382/159 |
| 2016/0100051 A1* | 4/2016 | Yliaho | H04M 3/42042 |
| | | | 455/415 |
| 2016/0140826 A1* | 5/2016 | Sahiholnasab | A61B 5/486 |
| | | | 600/587 |
| 2016/0170710 A1* | 6/2016 | Kim | G06F 3/167 |
| | | | 704/275 |
| 2016/0188292 A1* | 6/2016 | Carter | G10L 15/197 |
| | | | 704/257 |
| 2016/0306797 A1* | 10/2016 | Taboriskiy | H04N 21/42203 |
| 2016/0323508 A1* | 11/2016 | Ayalasomayajula | |
| | | | H04N 23/6812 |
| 2016/0358085 A1* | 12/2016 | Abadi | G16H 50/70 |
| 2016/0364381 A1* | 12/2016 | Brown | G10L 15/32 |
| 2016/0379213 A1* | 12/2016 | Isaacson | G06Q 20/3678 |
| | | | 705/44 |
| 2017/0011254 A1* | 1/2017 | Guo | G06Q 30/0639 |
| 2017/0059265 A1* | 3/2017 | Winter | H04N 23/51 |
| 2017/0091433 A1* | 3/2017 | Anderson | G06N 20/00 |
| 2017/0112381 A1* | 4/2017 | Kumar | A61B 5/0077 |
| 2017/0161382 A1* | 6/2017 | Ouimet | G06F 16/434 |
| 2017/0192465 A1* | 7/2017 | Lazaridis | G06F 1/1694 |
| 2017/0212643 A1* | 7/2017 | Stewart | G06F 3/013 |
| 2017/0242990 A1* | 8/2017 | Chien | G06F 21/6218 |
| 2017/0325038 A1* | 11/2017 | Yu | H04R 29/001 |
| 2017/0344170 A1* | 11/2017 | Billerbeck | G06F 3/04886 |
| 2018/0005395 A1* | 1/2018 | D'Angelo | G08B 21/0461 |
| 2018/0039859 A1* | 2/2018 | Harwath | G06V 20/35 |
| 2018/0053338 A1* | 2/2018 | Khademolhosseini | |
| | | | G06T 15/205 |
| 2018/0288214 A1* | 10/2018 | Lv | H04M 1/72412 |
| 2018/0307303 A1* | 10/2018 | Powderly | G02B 27/0179 |
| 2018/0352440 A1* | 12/2018 | Ballard | H04L 63/0861 |

(56) References Cited

U.S. PATENT DOCUMENTS

| | | | | |
|---|---|---|---|---|
| 2018/0373719 | A1* | 12/2018 | Valliani | G06F 16/5846 |
| 2019/0008465 | A1* | 1/2019 | Muehlsteff | A61B 5/74 |
| 2019/0027147 | A1* | 1/2019 | Diamant | G10L 15/22 |
| 2019/0029147 | A1 | 1/2019 | Cordes | |
| 2019/0091433 | A1 | 3/2019 | Barlow et al. | |
| 2019/0115033 | A1* | 4/2019 | Lesso | G10L 17/00 |
| 2019/0156210 | A1* | 5/2019 | He | G06F 17/15 |
| 2019/0156222 | A1* | 5/2019 | Emma | G06N 5/041 |
| 2019/0212125 | A1* | 7/2019 | Deleu | G01S 7/4808 |
| 2019/0302895 | A1* | 10/2019 | Jiang | G06F 3/016 |
| 2019/0327331 | A1* | 10/2019 | Natarajan | G06F 16/3344 |

FOREIGN PATENT DOCUMENTS

| | | |
|---|---|---|
| JP | 2016/062397 | 4/2016 |
| KR | 1020170046958 | 5/2017 |

OTHER PUBLICATIONS

International Search Report for Application No. PCT/US2019/031969, dated Aug. 14, 2019, 14 pages.

Matthews, "How to Access Siri from the Lock Screen on an iPhone 7", www.live2tech.com/access-suru-lock-screen-iphone-7, Sep. 27, 2017, 10 pages.

\* cited by examiner

SELECTING AN INPUT MODE FOR A VIRTUAL ASSISTANT

RELATED APPLICATIONS

The present application is a continuation of U.S. patent application Ser. No. 15/981,536 filed on May 16, 2018, which is incorporated by reference herein in its entirety for all purposes.

BACKGROUND

Virtual assistants are software applications that can perform tasks or services for users, such as answer questions, play music, schedule events in a calendar application, etc. The virtual assistants typically receive requests via voice or text in natural language form. For example, a user can ask a virtual assistant a question using voice and the virtual assistant can recognize the voice input, and provide an answer to the question using a speaker or presenting the answer in a user interface.

SUMMARY

This specification describes technologies relating to selecting an input mode for providing content to a user based on one or more signals. In general, one innovative aspect of the subject matter described in this specification can be embodied in methods that include receiving request data specifying a request to launch a virtual assistant application from a lock screen of a mobile device; in response to receiving the request data, obtaining input signals, each of the input signals being of an input type different from each other input type of each other input signal, and each input signal being an input for the virtual assistant, the input types for the input signals including an image type and an audio type, wherein the input signal of the image type is pixel data for an image captured by a camera of the mobile device, and the input signal of the audio type is audio data for audio input captured by a microphone of the mobile device; selecting, based on the input signals and from multiple candidate input modes, an input mode for the virtual assistant application, wherein each candidate input mode is of an input type different from each other input type of each other candidate input mode, and the input types include an image type and an audio type, wherein the input mode of the image type receives pixel data for input to the virtual assistant application, and the input mode of the audio type receives audio input for the virtual assistant application; and presenting, by the virtual assistant application, content to a user of the mobile device, the presented content being selected based on the input signal received using the selected input mode. Other implementations of this aspect include corresponding apparatus, devices, systems, and computer programs, configured to perform the actions of the methods, encoded on computer storage devices.

These and other implementations can each optionally include one or more of the following features. In some aspects, selecting, based on the input signals and from multiple candidate input modes, an input mode for the virtual assistant application includes determining, based on the pixel data, whether the image includes one or more recognized objects, determining, based on the audio data, whether the audio includes one or more recognized spoken words, and selecting, based on the respective determinations, at least one of the input modes.

Some aspects include transmitting, to a remote server, input of the plurality of input signals based upon the selected input mode. The content presented to the user can be received from the remote server based upon the transmitted input of the input signals.

Some aspects include selecting a user interface for presentation by the virtual assistant application based on the selected input mode. The content can be presented using the selected user interface.

In some aspects, obtaining a input signals includes determining a location of the mobile device with respect to the user based on data received from one or more of an accelerometer of the mobile device or a gyroscope of the mobile device. Selecting, based on the input signals and from multiple candidate input modes, an input mode for the virtual assistant application can include selecting the input mode based on the location of the mobile device with respect to the user.

In some aspects, obtaining input signals includes determining a direction in which the camera of the mobile device is pointing based on data received from one or more of an accelerometer of the mobile device or a gyroscope of the mobile device. Selecting, based on the input signals and from multiple candidate input modes, an input mode for the virtual assistant application can include selecting the input mode based on the direction in which the camera of the mobile device is pointing.

In some aspects, obtaining one or more signals related to the inputs for the virtual assistant can include obtaining geographic location data specifying a geographic location of the mobile device. Selecting, based on the one or more signals and from multiple candidate input modes, an input mode for the virtual assistant application can include selecting the input mode based on the geographic location of the mobile device.

In some aspects, selecting, based on the one or more signals and from multiple candidate input modes, an input mode for the virtual assistant application can include determining whether the voice input includes a query and selecting an audio input mode in response to determining that the voice input includes the query. In some aspects, presenting, by the virtual assistant application, content to a user of the mobile device can include at least one of presenting image content in a user interface of the virtual assistant application, presenting video content in the user interface of the virtual assistant application, or playing audio content.

The subject matter described in this specification can be implemented in particular embodiments so as to realize one or more of the following advantages. By automatically determining an input mode based upon received input signals, the input signals can be processed more effectively and efficiently. For example, by first determining an input mode based upon the received signals, further processing of input signals that do not provide useful input can be avoided. For example, it may be determined that received image or audio data is not an input signal provided as part of a query and computationally expensive image or audio processing techniques such as techniques for object recognition and/or classification may therefore not be applied to a received image-based input signal. Transmission of input signals to a remote device may additionally or alternatively be avoided, avoiding bandwidth usage for transmission of signals to the remote device that are not suitable for processing at the remote device. By selecting an input mode in response to a user launching a virtual assistant application from a lock screen (or other user interface element), the virtual assistant application can identify and present content more quickly based on input signals received from the selected input mode than waiting for the user to select an input mode or prompting the user to select from multiple input modes. Using the appropriate input mode allows the virtual assistant application to more accurately respond to the user's request, e.g., by providing the appropriate content in response to the user's request.

This prevents the user from having to make multiple requests which, in turn, reduces the number of times computing system(s) process the requests to identify and select content. Aggregated over many users, this can significantly improve the functioning of computers of a content distribution system that selects the content by reducing the processing demands placed on the computers. As the content distribution system may be accessed over a network, reducing the number of requests can also reduce the amount of bandwidth consumed, allowing bandwidth for other network traffic and/or increasing the speed of the network.

By selecting the appropriate input mode for the user, the user is not burdened with having to select an input mode for each request. This can improve the user experience and allow for quicker requests by the user and more flexibility for the user. For example, the user can hold the mobile device such that the camera is pointing at an object and obtain information about the object without having to also interact with the mobile device to select a camera input mode.

Various features and advantages of the foregoing subject matter are described below with respect to the figures. Additional features and advantages are apparent from the subject matter described herein and the claims.

BRIEF DESCRIPTION OF THE DRAWINGS

Like reference numbers and designations in the various drawings indicate like elements.

DETAILED DESCRIPTION

In general, systems and techniques described herein can select an input mode for use in selecting content to present to a user. The input mode can be selected from multiple different input modes where each input mode is of an input type different from each other input type of each other input mode. For example, the input modes can include an audio input mode of an audio type (e.g., voice input), an image input mode of an image type, a text input mode of a text type, and/or a combination input mode of a combination of two or more input types (e.g., voice and image). The input mode can be selected in response to a request to launch a virtual assistant application (or another application). The virtual assistant application can select the input mode based on input signal(s) received from the multiple different candidate input modes.

For example, a user can request to launch a virtual assistant application from a lock screen of a mobile device by making a gesture, such as swiping an icon presented on the lock screen in a particular direction. In response to detecting the request, the virtual assistant application can obtain one or more signals and determine which input mode to use in identifying content based on the one or more signals.

The signals can be related to the input modes of the virtual assistant application. For example, the signals can include words or phrases recognized in voice input, pixel data of a viewfinder of a camera of the mobile device (e.g., whether an object is detected in the viewfinder and/or the object or type of object recognized), and/or a position and/or orientation of the mobile device (e.g., whether the mobile device is near the user's face or facing downwards). The signals can also include the geographic location of the mobile device (e.g., in what type of building the mobile device is located), environmental signals (e.g., the amount of lighting and/or ambient noise), the user's history or preferences for input modes based on previous signal(s), and/or other appropriate signals.

For example, if the voice input includes a question and an object is not recognized in pixel data that represents what is shown in the viewfinder (e.g., what is being captured by the camera), a voice input mode may be selected as the user is likely asking the virtual assistant application the question and not pointing the camera at an object in which the user is interested. In another example, if the user is holding the mobile device near the user's face and one or more objects are detected in the pixel data, the user is likely requesting information about one of the objects.

Figure 1:
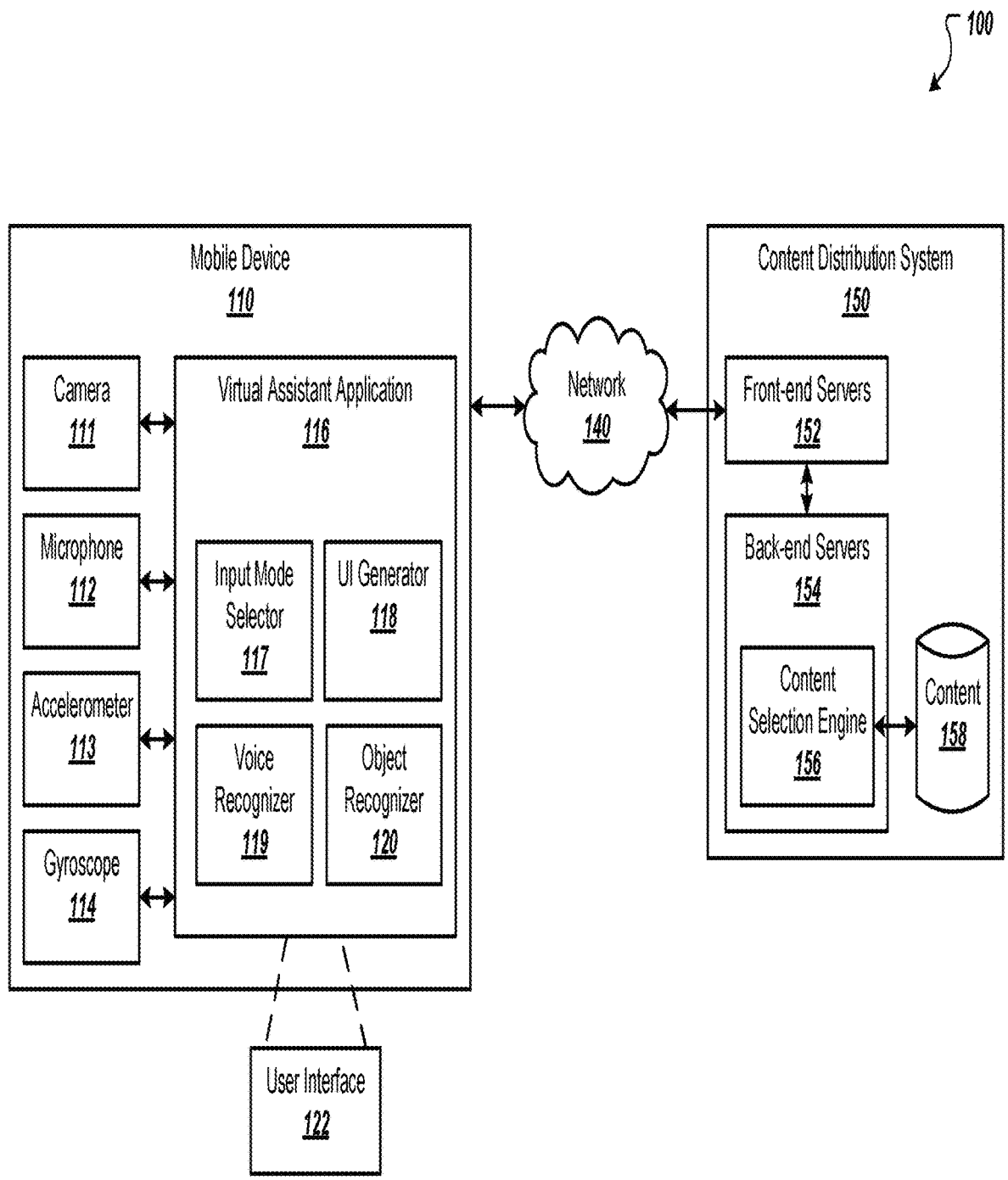
FIG. 1 is a block diagram of an environment in which a virtual assistant application selects an input mode and presents content selected based on an input signal received using the selected input mode.

FIG. 1 is a block diagram of an environment 100 in which a virtual assistant application 116 selects an input mode and presents content selected based on an input signal received using the selected input mode. The virtual assistant application 116 can be installed on and/or executed by a mobile device 110. A mobile device 110 is an electronic device that is capable of sending and receiving data over a data communication network 140. Example mobile devices 110 include smart phones, tablet computing devices, wearable computing devices (e.g., smart watches), and other devices that can send and receive data over the network 140. The network 140 can include a local area network (LAN), a wide area network (WAN), the Internet, a mobile network, or a combination thereof.

The virtual assistant application 116 can be implemented as a native application developed for a particular platform or a particular device. The virtual assistant application 116 can perform tasks or services for a user of the mobile device 110. For example, the virtual assistant application 116 can answer user questions, identify and present data related to objects (e.g., objects depicted in an image or viewfinder of a camera 111), play music, configure other applications (e.g., set up a meeting in a calendar application), and/or other appropriate tasks or services.

The virtual assistant application 116 can receive requests (e.g., questions, commands, or requests for information) via multiple different input modes. For example, the virtual assistant application 116 can receive voice requests from a microphone 112 of the mobile device 110. The virtual assistant application 116 can also detect and/or recognize objects in a viewfinder of a camera 111 of the mobile device 110 and interpret the fact that the user is pointing the camera 111 at the objects as a request for more information about the objects. In some implementations, the virtual assistant application 116 can also receive text requests, e.g., typed in using a physical or touch keypad of the mobile device 110.

The mobile device 110 can allow access to the virtual assistant application 116 from a lock screen of the mobile device 110. A lock screen is a user interface element that regulates access to the mobile device 110 by requiring the user to perform an action to access the mobile device 110. The mobile device 110 can be configured to launch the virtual assistant application 116 in response to detecting a particular user action (e.g., gesture) while the mobile device 110 is locked. For example, the user action can be a swipe of an icon in a particular direction, moving the mobile device 116 in a particular motion, speaking a particular command, or another appropriate action.

In response to detecting the particular user action, the mobile device 110 can launch the virtual assistant application 116 and present a user interface of the virtual assistant application 116. In addition, the virtual assistant application 116 can obtain one or more input signals for selecting from multiple different candidate input modes. Each candidate input mode can be of an input type different from each other input type of each other candidate input mode. The candidate input modes can include an image input mode of an image type and an audio input mode of an audio type. The image input mode can receive pixel data for input to the virtual assistant application. Similarly, the audio input mode can receive audio input for the virtual assistant application.

The candidate input modes can also include a combination input mode that receives inputs of two or more types (e.g., pixel data and audio data, or audio data and text data). As described above, the input mode can be selected based on one or more of the input signals, e.g., using a set of rules or a machine learning model.

Each of the input signals can be of an input type different from each other input type of each other input signal. For example, the input types can include an image type and an audio type. The input signal of the image type can be pixel data for one or more images captured by a camera of the mobile device, e.g., captured after the mobile device detects the request to launch the virtual assistant application. The pixel data can include a respective pixel data set for each image. Each pixel data set can represent the pixels of the viewfinder of the camera for a particular point in time. The pixel data in each pixel data set can include data specifying visual characteristics (e.g., color, intensity, brightness, etc.) of each pixel of the viewfinder of the camera.

The input signal of the audio type can be audio data for audio input captured by a microphone of the mobile device. For example, the audio data can include text that represents spoken words in the audio input if the audio input includes spoken words. For example, the virtual assistant application (or another application) can convert the audio data to text using audio transcription techniques.

The virtual assistant application 116 includes an input mode selector 117 that selects the input mode based on the input signal(s). The virtual assistant application 116 can begin obtaining the signals when the virtual assistant application 116 is launched. For example, the virtual assistant application 116 can begin obtaining audio input from the microphone 112 and pixel data for the viewfinder from the camera 111 when the virtual assistant application 116 is launched. The input mode selector 117 can monitor these signals until the input mode selector 117 has enough information to select an input mode. For example, the input mode selector 117 can monitor a stream of audio, pixel data for a stream of images, and/or the other signals until the input mode selector 117 obtains enough data to make a decision as to which input mode to select.

The determination of whether enough data has been obtained can be based on whether a query is detected in audio input, whether an object, a class of objects is detected in pixel data for the viewfinder, whether an object is recognized (e.g., the actual object is identified), whether the position of the mobile device with respect to the user can be determined, or a combination of one or more of these signals. In some implementations, the input mode selector 117 determines a confidence score for a candidate input mode based on one or more of these signals. If the confidence score meets or exceeds a threshold, the input mode selector 117 can select the candidate input mode.

The virtual assistant application 116 includes a voice recognizer 119 that can receive audio input from the microphone 112 and translate the audio into text (if the audio includes spoken words) and provide the text to the virtual assistant application 116. The virtual assistant application 116 can then use the text (alone or in combination with other signal(s)) to select an input mode.

In some implementations, the input mode selector 117 can select the input mode based on whether text output by the voice recognizer 119 includes a query. For example, the input mode selector 117 can compare the text to a set of queries (e.g., previous queries received by virtual assistant applications from one or more users or a set of defined queries). If the text matches a query, the input mode selector 117 can select the audio input mode and use the text to identify content to present to the user. In another example, the input mode selector 117 uses a language model to determine the likelihood that the text includes a query. The language model can be trained using the set of queries, e.g., using labeled training data that specifies which text is a query and which text is not a query. The language model can output a likelihood that input text includes a query based on input text.

The input mode selector 117 can use the data specifying whether the text includes a query alone or in combination with other signals to select the input mode. If the text includes a query, it is more likely that the user is requesting content based on the user's voice input, which has been translated into the text. Thus, the input mode selector 117 may select an audio input mode and use the text to select content to present to the user when the text includes a query.

The input mode selector 117 can select the input mode based on pixel data for the viewfinder of the camera 111. The virtual assistant application 116 can obtain pixel data from the camera 111 after the virtual assistant application 116 is launched. For example, the virtual assistant application 116 can obtain a stream of pixel data sets. Each pixel data set can represent the pixels of the viewfinder for a particular point in time. The pixel data in each pixel data set can include data specifying visual characteristics (e.g., color, intensity, brightness, etc.) of each pixel of the viewfinder.

In some implementations, the input mode selector 117 selects the input mode based on the overall brightness of the pixels. For example, if the overall brightness is low (e.g., less than a threshold), the user may be outside at night or in a dark location where it is unlikely the user is requesting content based on what can be detected in the viewfinder of the camera 111. However, if the overall brightness of the pixels is high (e.g., greater than a threshold), the user may be outside during the day or in a well-lit room where the user may be attempting to obtain information in the viewfinder of the camera 111. The overall brightness of a pixel data set can be determined based on a combination of the visual characteristics of each pixel in the pixel data set (e.g., an average of the brightness values across all of the pixels in the pixel data set).

The input mode selector 117 can select the input mode based on whether an object is detected in the viewfinder (e.g., in one or more of the pixel data sets) and, if so, the identity of the object or the class of the object. For example, the virtual assistant application 116 can include an object recognizer 120 that attempts to detect and recognize (e.g., identify) objects in pixel data (or images). The object recognizer 120 can detect various objects, such as people, barcodes, landmarks, paintings, vehicles, and/or other types of objects using edge detection and/or other object recognition techniques.

In some implementations, the object recognizer 120 includes a coarse classifier that determines whether a pixel data set includes an object in one or more particular classes (e.g., categories) of objects. For example, the coarse classifier may detect that a pixel data set includes an object of a particular class, with or without recognizing the actual object.

The coarse classifier can detect the presence of a class of objects based on whether or not the image includes one or more features that are indicative of the class of objects. The coarse classifier can include a light-weight model to perform a low computational analysis to detect the presence of objects within its class(es) of objects. For example, the coarse classifier can detect, for each class of objects, a limited set of visual features depicted in the image to determine whether the image depicts an object that falls within the class of objects. In a particular example, the coarse classifier can detect whether an image depicts an object that is classified in one or more of the following classes: text, barcode, landmark, media object (e.g., album cover, movie poster, etc.), or artwork object (e.g., painting, sculpture, etc.). For barcodes, the coarse classifier can determine whether the image includes parallel lines with different widths.

In some implementations, the coarse classifier uses a trained machine learning model (e.g., a convolutional neural network) to classify images based on visual features of the images. For example, the machine learning model can be trained using labeled images that are labeled with their respective class(es). The machine learning model can be trained to classify images into zero or more of a particular set of classes of objects. The machine learning model can receive, as inputs, data related to the visual features of an image and output a classification into zero or more of the classes of objects in the particular set of classes of objects.

The coarse classifier can output data specifying whether a class of object has been detected in the image. The coarse classifier can also output a confidence value that indicates the confidence that the presence of a class of object has been detected in the image and/or a confidence value that indicates the confidence that an actual object, e.g., the Eiffel Tower, is depicted in the image.

The object recognizer 120 can provide, to the input mode selector 117, data specifying whether an object was detected in a pixel data set, and if an object was recognized, data identifying the recognized object. When a coarse classifier is used, the object recognizer 120 can provide, to the input mode selector 117, data specifying whether the presence of an object within at least one of the classes of objects has been detected and, if so, the detected class. As described above, the virtual assistant application 116 can receive a stream of pixel data sets. In this example, the object recognizer 120 can evaluate each pixel data set and provide this data to the input mode selector 117 for each (or at least a portion of) the pixel data sets in the stream.

The input mode selector 117 can select the input mode based on whether one or more pixel data sets include an object, the actual object recognized, and/or the class(es) of object(s) detected in the pixel data set. For example, if an object is detected in the viewfinder (based on a pixel data set for the viewfinder), it's more likely the user is requesting content based on what's in the viewfinder than if there are no detectable objects in the viewfinder. Thus, the input mode selector 117 can select an image input mode if an object or class of objects is detected in the pixel data.

The input mode selector 117 can select an image input mode rather than other input modes if particular objects or classes of objects are detected. For example, if a landmark or famous painting is detected, it's more likely that the user is requesting content about the landmark or famous painting than if wood flooring or sand is detected.

The input mode selector 117 can also select an input mode based on a sequence of pixel data sets, e.g., in a stream. For example, if the objects recognized in the pixel data sets change in over a short period of time (e.g., 2-5 seconds), it may be likely that the user is moving the mobile device 110 around and not trying to obtain content for a particular object and an audio input mode may be selected if the audio input includes a query. However, if the same object is recognized in a sequence of pixel data sets, it is more likely the user is requesting content for the object and an image input mode may be selected.

The input mode selector 117 can also select an input mode based on the location of the mobile device 110, e.g., with respect to the user, and/or the orientation of the mobile device 110. For example, if the mobile device 110 is near the user or the user's face (e.g., within a threshold distance), it is likely that the user is viewing the viewfinder and is requesting content for the object(s) in the viewfinder and an image input mode may be selected. If the mobile device is far from the user or the user's face (e.g., greater than a threshold distance away), it is less likely the viewfinder is viewing the viewfinder an audio input mode may be selected.

In some implementations, the input mode selector 117 can determine whether the mobile device 110 is close to the user's face based on recent movements (e.g., within a threshold amount of time before the request to launch the virtual assistant application is received). For example, the input model selector 117 can obtain data from an accelerometer 113 and/or a gyroscope 114 describing the motion of the mobile device 110, e.g., in a continuous stream. The input mode selector 117 can determine whether the mobile device 110 was moved upwards (e.g., at least a threshold distance) within the threshold amount of time prior to the request being received. If so, the input mode selector 117 can determine that the mobile device 117 is likely to be close to the user's face. Similarly, of the mobile device 110 moved downwards at least a threshold distance, it's likely that the mobile device is not close to the user's face.

In some implementations, the input mode selector 117 can determine whether the mobile device 117 is close to the user's face based on the audio input. For example, the input mode selector 117 can determine whether the mobile device 117 is close to the user's face based on the intensity of voice input detected in the audio input. If the voice input is at least a threshold intensity, the input mode selector 117 can determine that the mobile device 110 is close to the user's face.

The input mode selector 117 can also select an input mode based on the orientation of the mobile device 110 or the angle of the mobile device 110 with respect to ground. The input mode selector 117 can determine the orientation or angle of the mobile device 110 based on data received from the accelerometer 113 and/or a gyroscope 114. If the mobile device 110 is oriented such that the camera 111 is facing horizontally or upwards from the user, it may indicate that the user is pointing the camera at an object to obtain content related to the object and an image input mode may be selected. If the mobile device 110 is oriented such that the camera 111 is facing downwards from the user, it may indicate that the user is speaking to the mobile device 110 rather than pointing the camera at an object, and an audio input mode may be selected.

The input mode selector 117 can also select an input mode based on the location of the mobile device 110, e.g., the geographic location of the mobile device 110. For example, the mobile device 110 can include a Global Positioning System (GPS) sensor that determines the geographic location of the mobile device 110. The input mode selector 117 can use the geographic location to determine what building, type of building, outside area (e.g., park, landmark, monument), or other area where the mobile device 110 is located. For example, the input mode selector 117 can compare GPS coordinates for the mobile device 110 to GPS coordinates of known locations to determine what type of building or area the mobile device 110 is located. Users may be more likely to request content based on images of objects than voice in certain types of locations (e.g., in museums, at landmarks, etc.). When the mobile device 110 is at (or within a threshold distance from) one of these locations, the input mode selector 117 can select an image input mode. If the mobile device 110 is located in a type of location where users are more likely to request content using voice requests, the input mode selector 117 can select an audio input mode.

The input mode selector 117 can select an input mode based on the user's history or preferences for input modes based on previous signal(s). For example, a user can select which input mode the user prefers for particular circumstances related to the signals. In a particular example, the user may select an image input mode when the mobile device is pointing at an upward angle, a particular class of object is detected in the viewfinder, or when the user speaks a particular phrase. If the signals match one of these circumstances, the input mode selector 117 can select the image input mode.

In another example, the input mode selector 117 can maintain a history of the input mode selected by the user for various values of the signals. For example, the input mode selector 117 can maintain, for a user, the number of times the user selects each input mode for each value of each individual signal or each combination of signals. If the user selects one input mode more often than the other input modes when signal(s) have particular value(s) or are within particular range(s), the input mode selector 117 can select the one input mode when the signal(s) have the particular value(s) or range of value(s). For example, if the user selects an image input mode when the overall pixel brightness is greater than a threshold value, the input mode selector 117 can select the image input mode when the overall brightness value for a pixel data set for the viewfinder is greater than the threshold value.

As the input mode selector 117 can obtain multiple signals when the virtual assistant application is launched, the selection of the appropriate input mode may be difficult. In some implementations, the input mode selector 117 processes a set of rules or other logic to select the input mode based on the signals. In one example, the rules can specify a hierarchy or relative importance of the signals. For example, detection of an object may have a higher weight than the location or orientation of the mobile device 110. In this example, if an object is detected in pixel data, the input mode selector 117 can select an image input mode irrespective of the position or orientation of the mobile device 110.

The input mode selector 117 can process rules in order to select the input mode. For example, the first rule may specify that if an object is detected, an image input mode should be selected. If not, the second rule should be processed. The second rule may specify that if the audio input includes a query, an audio input mode should be selected. If not, the third rule should be processed and so on until a selection of an input mode is selected.

In some implementations, the input mode selector 117 uses a trained machine learning model to select the input mode. The machine learning model can be trained using labeled training data that specifies, for each of multiple different combinations of signals, which input mode should be selected. The various signals obtained by the input mode selector 117 can be provided as inputs to the machine learning model. The output of the machine learning model is a selection of one of the input modes based on the input.

In some implementations, the input mode selector 117 can select an input mode that is based on both audio and image inputs. For example, the input mode selector 117 can select such an input mode when the text translated from the audio is related to an object recognized in the pixel data for the viewfinder. The input mode selector 117 can determine that the text is related to the object when the text refers to the same object, the same class of object, or a characteristic of the object. In a particular example, the user may speak "how much does this car cost" while pointing the camera 111 of the mobile device 110 at a car. The input mode selector 117 can determine that both inputs are related to a car and select the audio and image input mode.

After the input mode selector 117 selects an input mode, the virtual assistant application 116 can send inputs for the input mode to a content distribution system 150 over the network 140. For example, if an image input mode is selected, the virtual assistant application 116 can send one or more pixel data sets to the content distribution system 150. The pixel data set(s) can include pixel data for the viewfinder used to select the image input mode and/or pixel data sets captured after the image input mode is selected. For example, the virtual assistant application 116 can first send the pixel data set(s) used to select the image input mode. If the viewfinder is later pointing at a different object, the virtual assistant application 116 can send pixel data for the different object to the content distribution system 150. The virtual assistant application 116 may therefore transmit inputs to the content distribution system 150 based upon the selected input mode. For example, only inputs associated with an input mode that are selected may be transmitted to the content distribution system. The virtual assistant application 116 may therefore preprocess input signals to determine input signals that are useful for providing content to a user and/or that are intended as input from a user and only transmit input signals that are determined to be useful for providing content to the user. Transmittal of input signals over a communications network may therefore be reduced by only sending useful input signals.

Similarly, the virtual assistant application 116 can send, to the content distribution system 150, text translated from audio input captured before and/or after an audio input mode is selected. For example, if the text translated after the audio input mode was selected includes a different query than the text translated from audio captured before the audio input mode was selected, the virtual assistant application 116 can send the text including the different query to the content distribution system 150.

The content distribution system 150 can select content for presentation to the user at the mobile device 110 based on the data (e.g., pixel data and/or text translated from audio) received from the mobile device 110. The content distribution system 150 includes one or more front-end servers 152 and one or more back-end servers 154. The front-end servers 152 can receive the data from the mobile devices 110 and provide the data to the back-end servers 154. The front-end servers 152 can also send content to the mobile devices 110 in response to receiving the data.

The back-end servers 154 includes a content selection engine 156 that selects content for providing to mobile devices 110 in response to the data received from the mobile devices 110. As used herein, the term engine refers to a data processing apparatus that performs a set of tasks. The content selection engine 156 can select content from a content data storage unit 158 (e.g., one or more hard drives, flash memory, etc.) that stores content related to objects, information that may be requested by users, music, videos, images, information related to barcodes, and/or other appropriate content. The content selection engine 156 can select, from the content stored in the content data storage unit 158, one or more content items that are most relevant to the data received from the mobile device 110.

For example, if pixel data received from a mobile device 110 represents an image of a barcode, the content selection engine 156 can identify the object represented by the barcode and select content (e.g., images, title, etc.) related to the object. If the pixel data represents an image of a landmark, the content selection engine 156 can select content related to the landmark, e.g., photos of the landmark, a map to the landmark etc. If text translated from voice input includes a query for a particular fact or characteristic of an object (e.g., what is the average temperature in Florida in April?), the content selection engine 156 can identify this average temperature from the data stored in the content data storage unit 158.

The back-end servers 154 can provide content selected by the content selection engine 156 to the front-end servers 152. The front-end servers 152 can, in turn, provide the content to the mobile device 110 from which the data used to select the content was received.

The virtual assistant application 116 includes a user interface generator 118 that generates, updates, and presents user interfaces 122 at the mobile device 110. The user interfaces 122 can present content received from the content distribution system 150 in response to sending data for the selected input mode to the content distribution system 150. The user interfaces 122 can also present the data (or a portion of the data) that was sent to the content distribution system 150. For example, if the user asked the virtual assistant application 116 a question, the user interface 122 that provides an answer to the question can also include the question itself. In this way, the user has confirmation that the answer is an answer to the question that the user asked. Similarly, if content is being provided based on pixel data for the viewfinder of the camera 111, an image represented by the pixel data can be presented in the user interface 122. This provides similar confirmation.

The user interface generator 118 can select and/or configure the user interface 122 based on the selected input mode. For example, the user interface generated when an image input mode is selected may be different (e.g., include different types of content, have different layouts, include different interface controls, etc.) from the user interface generated when an audio input mode is selected. In a particular example, the user interface for an image input mode can include an image represented by the pixel data used to select the content while the user interface for an audio input mode can include a chat interface that presents the user's query and an answer to the query.

In some implementations, the input mode selector 117 and/or the user interface generator 118 can be implemented remote from the mobile device 110. For example, the input mode selector 117 and/or the user interface generator 118 can be implemented at the content distribution system 150. In such implementations, a user can select a feature that allows the virtual assistant application 116 to send pixel data and/or audio data to the content distribution system 150.

In some implementations, the content selection engine 156 is implemented on the mobile device 110. For example, the virtual assistant application 116 can include a content selection engine 156 and a content data storage unit that stores content, e.g., a more limited set of content than the content data storage unit 158. In this example, the virtual assistant application 116 can attempt to identify content in the content data storage unit of the virtual assistant application 116. If not suitable content is identified, the virtual assistant application 116 can request content from the content distribution system 150. In this way, content can be presented to the user more quickly in some cases than obtaining the content from the content distribution system 150.

Figure 2:
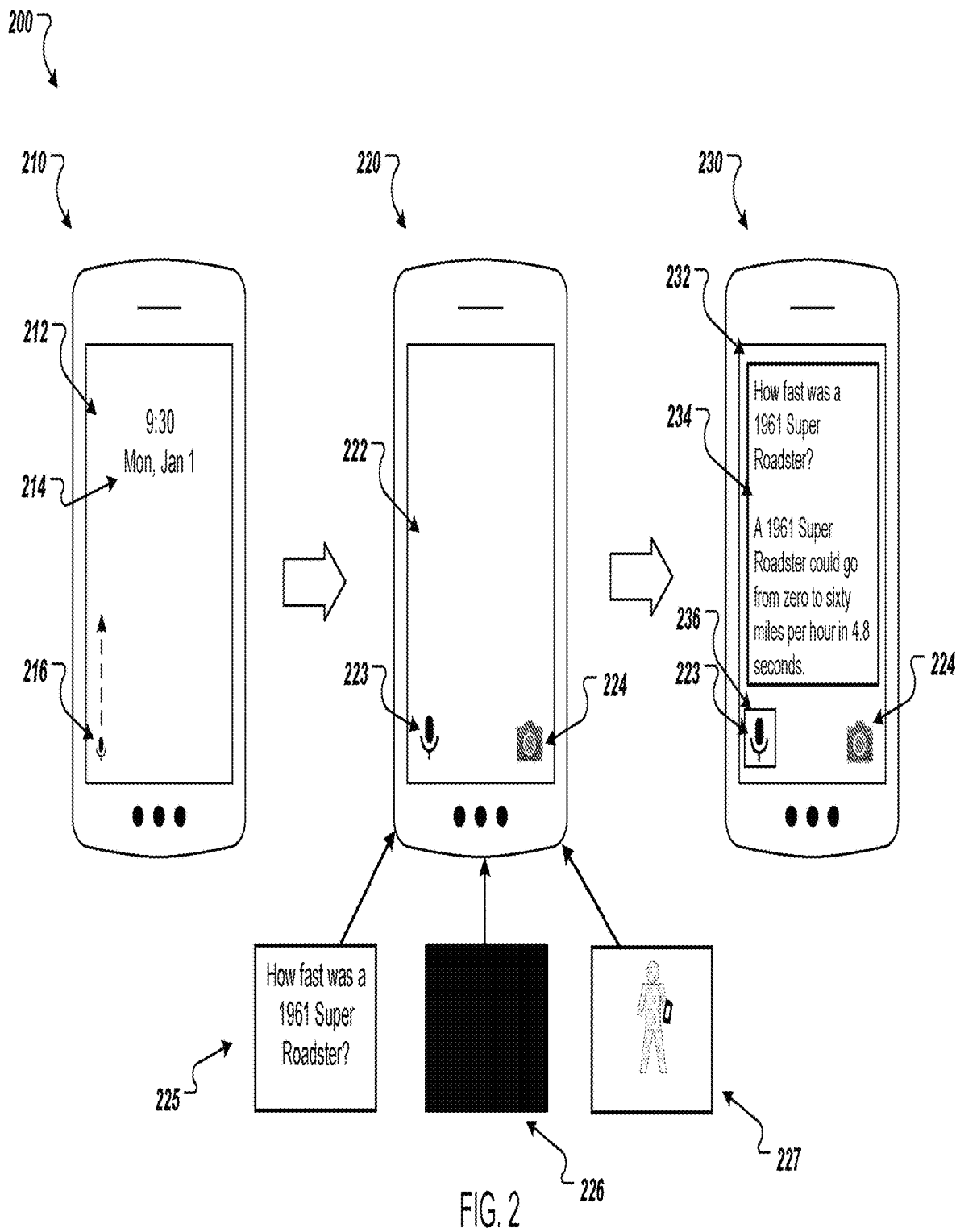
FIG. 2 depicts a sequence of example screen shots of a mobile device that selects an input mode and presents content selected based on an input signal received using the selected input mode.

FIG. 2 depicts a sequence of example screen shots 210, 220, and 230 of a mobile device that selects an input mode and presents content selected based on an input signal received using the selected input mode.

The first screen shot 210 depicts an example lock screen 212 of the mobile device. As described above, a lock screen 212 can regulate access to the mobile device. The lock screen 212 can also present information to the user. For example, the lock screen 212 presents the current date and time 214.

In this example, the user can access the mobile device by swiping the touch screen, e.g., in a particular direction. This would open the mobile device to a main user interface. The lock screen 212 also presents an icon 216 for a virtual assistant application. In this example, the icon 216 depicts a microphone symbol. However, the icon could present a camera symbol, both a microphone symbol and a camera symbol, or another appropriate symbol (or other visual element) for the virtual assistant application.

If the user swipes the icon 216 upwards (or another appropriate direction), the mobile device can allow access to the mobile device and present a user interface for the virtual assistant application. The second screen shot 220 presents an initial user interface 222 for the virtual assistant application. In this example, the initial user interface 222 presents an audio input mode selector control 223 and an image input mode selector control 224. If the user interacts with (e.g., selects) the audio input mode selector control 223, the virtual assistant application can use audio input to select content for presentation to the user. Similarly, if the user interacts with (e.g., selects) the image input mode selector control 224, the virtual assistant application 116 can use image input (e.g., pixel data for the viewfinder of the camera) to select content for presentation to the user. If other input modes are available, the initial user interface 222 can include selector controls that allow the user to select the other input modes.

In some implementations, the initial user interface 222 can present content or an animation that indicates that the virtual assistant application is attempting to identify content. For example, the initial user interface 222 can present a throbber animation that animates in a loop or another animation that signals that the virtual assistant application is identifying content for presentation to the user.

As described above, the virtual assistant application can select the input mode in response to the user launching the virtual assistant application, e.g., from the lock screen 212. To select the input mode, the virtual assistant application can obtain one or more signals. In this example, the virtual assistant application obtains audio input 225, image input 226 (e.g., in the form of pixel data), and proximity data 227 specifying the location of the mobile device with respect to the user's face.

The audio input 225 can be translated into text. In this example, the audio input 225 has been translated into the question "How fast was a 1961 Super Roadster?" For example, a user may have asked the virtual assistant application the translated question.

The image input 226 represents an image with a solid color in which each pixel has the same color. For example, the camera may have been facing the ground, a wall, or some other surface that has a solid color. The proximity data 227 indicates that the mobile device is below the user's face (e.g., based on motion data for the mobile device indicating that the mobile device was moving downward before and/or when the virtual assistant application was launched).

The virtual assistant application can use the audio input 225, the image input 226, and the proximity data 227 to select an input mode. In this example, virtual assistant application can identify a query in the audio input (e.g., a question query), determine that there is not an object in the image input 226, and determine that the mobile device is not near the user's face. Thus, the virtual assistant application can select an audio input mode as these signals indicate that it is more likely that the user is requesting content based on the translated question rather than the solid color in the image input 226.

After the input mode is selected, the virtual assistant application can present a user interface 232 that presents content selected using input(s) from the selected input mode, as shown in the screen shot 230. In this example screen shot 230, the user interface 232 presents a text box 234 that includes the question and the answer to the question. In other examples, the question and answer can be presented in a chat box that allows the user to ask other questions either using voice or text.

As described above, the user interface can be selected based on the selected input mode. In this example, the selected input mode is the audio input mode and a text-based user interface was selected. The user interface can also be selected based on the content that is selected for presentation. For example, of the user's question was "what does a 1961 Super Roadster look like," a user interface that presents an image of a 1961 Super Roadster could be selected and presented to the user.

The example user interface 232 also presents a box 236 around the audio input mode selector control 223 to indicate that the audio input mode was the selected input mode. Other visual indicators can also be used to indicate that the audio input mode was the selected input mode. If the user selects the image input mode selector control 224, the virtual assistant application can begin obtaining image inputs from the camera and select content to the present based on the image inputs. The virtual assistant application can also update the user interface or generate a user interface for the image input mode.

Figure 3:
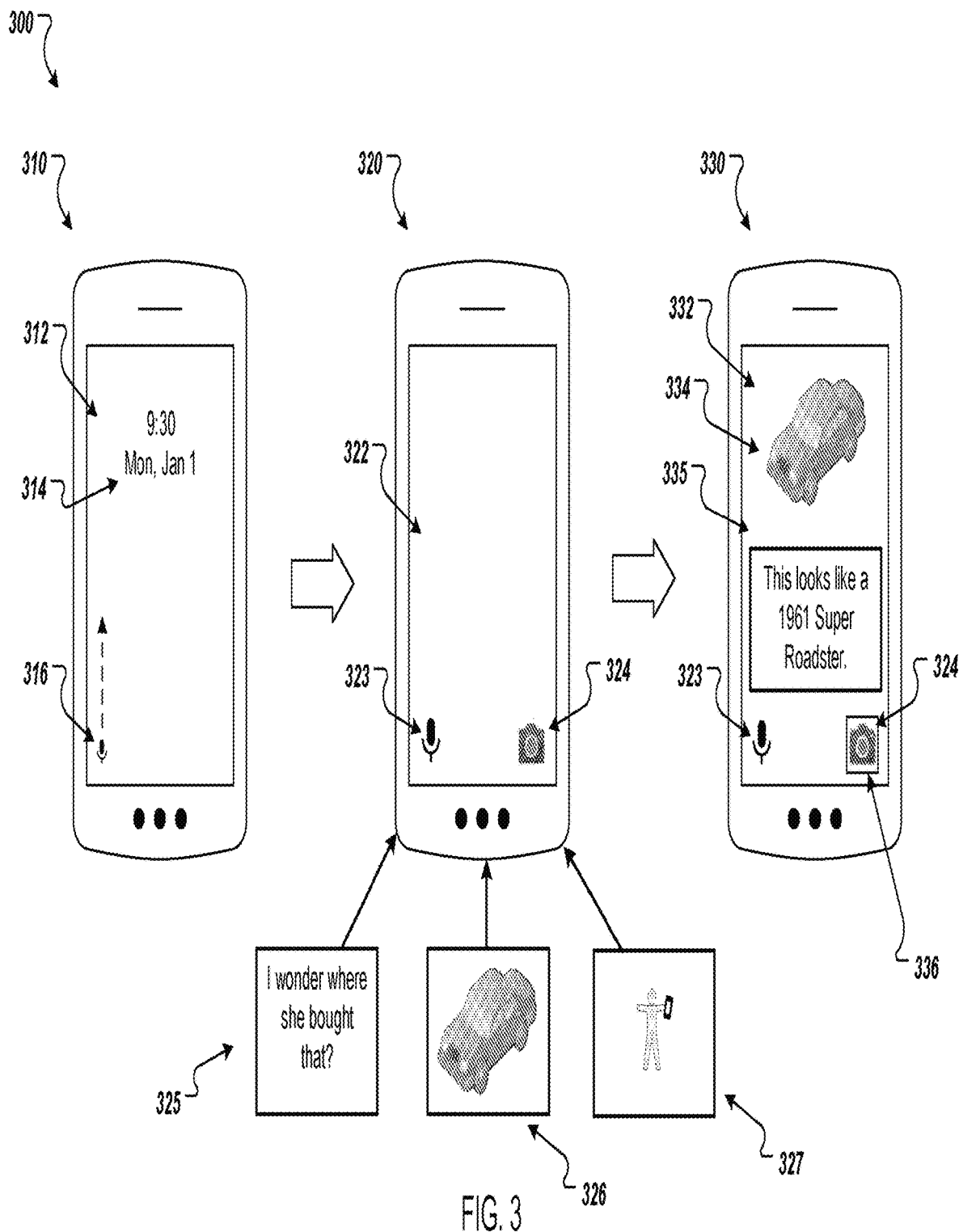
FIG. 3 depicts another sequence of example screen shots of a mobile device that selects an input mode and presents content selected based on an input signal received using the selected input mode.

FIG. 3 depicts another sequence of example screen shots 310, 320, and 330 of a mobile device that selects an input mode and presents content selected based on an input signal received using the selected input mode. The first screen shot 310 depicts an example lock screen 212 of the mobile device. The lock screen 312 can be the same as, or similar to, the lock screen 212 of FIG. 2. For example, the lock screen 312 presents the current date and time 314 and an icon 316 for a virtual assistant application.

The second screen shot 320 presents an initial user interface 322 for the virtual assistant application, which can be the same as, or similar to the initial user interface 222 of FIG. 2. For example, the initial user interface 322 presents an audio input mode selector control 323 and an image input mode selector control 324.

As described above, the virtual assistant application can select the input mode in response to the user launching the virtual assistant application, e.g., from the lock screen 312. To select the input mode, the virtual assistant application can obtain one or more signals, e.g., audio input 325, image input 326 (e.g., in the form of pixel data), and proximity data 327 specifying the location of the mobile device with respect to the user's face.

In this example, the audio input 325 has been translated into the question "I wonder where she bought that" and the image input 326 represents an image of a car, e.g., based on pixel data from a viewfinder of a camera that was pointing at the car. For example, the user may have pointed the camera at the car while talking to a friend about the car. The proximity data 327 indicates that the mobile device is about level (or near) with the user's face (e.g., based on motion data for the mobile device indicating that the mobile device was moving upwards before and/or when the virtual assistant application was launched, and/or based on audio data including voice with at least a threshold intensity).

The virtual assistant application can use the audio input 325, the image input 326, and the proximity data 327 to select an input mode. In this example, virtual assistant application can determine that the audio input 325 does not include a query as there is not an identifiable object in the translated text. The virtual assistant application can also determine that the image input 326 represents an image of an object or of a car (e.g., using object detection techniques), determine that the image input 326 represents an image of an object in a vehicle class (e.g., using a coarse classifier), and/or determine that the image input 326 represents an image of a particular car, e.g., a 1961 Super Roadster (e.g., using object recognition techniques).

As the image input 326 represents and image of an object, the proximity data 327 indicates that the mobile device is level with or near the user's face, and the audio input does not include a query, the virtual assistant application can select an image input mode.

After the input mode is selected, the virtual assistant application can present a user interface 332 that presents content selected using input(s) from the selected input mode, as shown in the screen shot 330. In this example screen shot 330, the user interface 332 presents an image 334 represented by the image input 324 and an information box 335 that includes information about the car depicted in the image. For example, the virtual assistant application (or a content distribution system) can recognize the car in the image and select content related to the car for presentation in the user interface 332. In this example, information about the car (e.g., the identity of the car) has been selected and presented. In other examples, other images of the car, video of the car, or other information about the car may be selected and presented. If the audio input included a question about the car, or that could be classified as a question about the car (e.g., what color is that? or what year is that car?), the virtual assistant application can select content that answers the question.

The example user interface 332 also presents a box 336 around the image input mode selector control 324 to indicate that the image input mode was the selected input mode. If the user selects the audio input mode selector control 323, the virtual assistant application can begin obtaining audio inputs from the microphone and select content to present based on the audio inputs. The virtual assistant application can also update the user interface or generate a user interface for the audio input mode.

Figure 4:
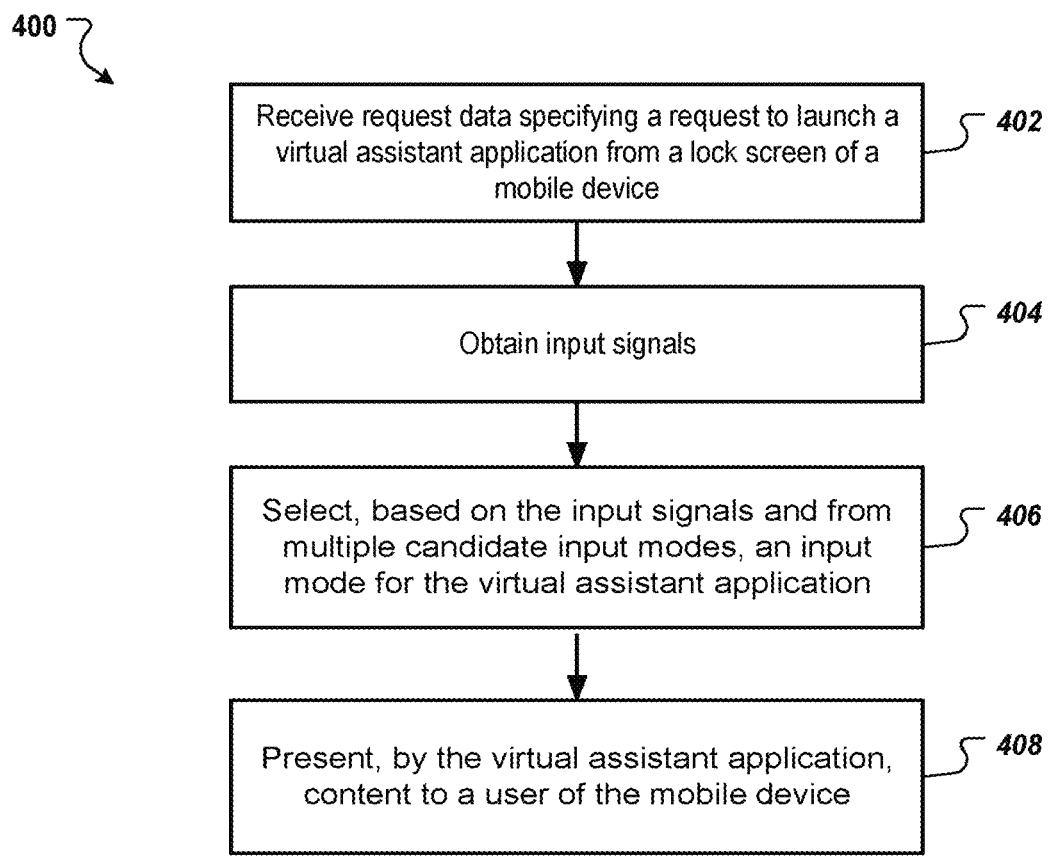
FIG. 4 is a flow chart of an example process for selecting an input mode for a virtual assistant application and presenting content based on an input signal received using the selected input mode.

FIG. 4 is a flow chart of an example process 400 for selecting an input mode for a virtual assistant application and presenting content based on an input signal received using the selected input mode. Operations of the process 400 can be performed, for example, by one or more data processing apparatus, such as the mobile device 110 of FIG. 1. Operations of the process 400 can also be implemented as instructions stored on a non-transitory computer readable medium. Execution of the instructions cause one or more data processing apparatus to perform operations of the process 400.

Request data specifying a request to launch a virtual assistant application from a lock screen of a mobile device is received (402). The mobile device can detect a particular action, gesture, or spoken commands at the lock screen (or while the mobile device is locked) that indicates that the user is requesting the mobile device to unlock the mobile device and launch the virtual assistant application. For example, the mobile device can detect a user swipe of an icon presented on the lock screen.

Input signals for the virtual assistant are obtained (404). Each of the input signals can be of an input type different from each other input type of each other input signal. For example, the input types can include an image type and an audio type. The input signal of the image type can be pixel data for one or more images captured by a camera of the mobile device, e.g., captured after the mobile device detects the request to launch the virtual assistant application. The pixel data can include a respective pixel data set for each image. Each pixel data set can represent the pixels of the viewfinder of the camera for a particular point in time. The pixel data in each pixel data set can include data specifying visual characteristics (e.g., color, intensity, brightness, etc.) of each pixel of the viewfinder of the camera.

The input signal of the audio type can be audio data for audio input captured by a microphone of the mobile device. For example, the audio data can include text that represents spoken words in the audio input if the audio input includes spoken words. For example, the virtual assistant application (or another application) can convert the audio data to text using audio transcription techniques.

The obtained signals can also include inputs of a proximity type that indicates a location of the mobile device with respect to the user or the user's face. The input signals of the proximity type can specify a distance between the mobile device and the user (or the user's face) and the relative location of the mobile device with respect to the user (or the user's face), e.g., above, even, below, to a particular side, etc.).

The obtained signals can also include inputs of a geographic location type. The input signals of the geographic location type can include a geographic location of the mobile device. For example, the virtual assistant application can obtain GPS coordinates from a GPS sensor of the mobile device. The virtual assistant application can use the coordinates and an index of locations to determine, for example, the type of building or area in which the mobile device is located (e.g., a museum, park, stadium, residence, retail store, etc.).

The obtained signals can include inputs of an environmental type. The inputs of the environmental type can include signals related to the lighting, noise, and/or other environment signals. For example, the mobile device can include a light sensor that detects the amount of ambient light at the location of the mobile device and/or an ambient noise sensor that detects the amount of ambient noise at the location of the mobile device. In another example, the virtual assistant application (or another application) can determine the amount of ambient lighting using the pixel data and/or determine the amount of ambient noise using the audio data.

The obtained signals can include the user's history or preferences for input modes based on previous signal(s). For example, if the user has previously selected an image mode for the virtual assistant as the preferred input mode when an object is recognized in an image, this data can be obtained by the virtual assistant application when selecting the input mode.

An input mode for the virtual assistant application is selected from multiple candidate input modes based on the one or more signals (406). Each candidate input mode can be of an input type different from each other input type of each other candidate input mode. The candidate input modes can include an image input mode of an image type and an audio input mode of an audio type. The image input mode can receive pixel data for input to the virtual assistant application. Similarly, the audio input mode can receive audio input for the virtual assistant application.

The candidate input modes can also include a combination input mode that receives inputs of two or more types (e.g., pixel data and audio data, or audio data and text data). As described above, the input mode can be selected based on one or more of the input signals, e.g., using a set of rules or a machine learning model.

In one example, the input mode is selected by determining, based on the pixel data for an image received using the image input mode, whether the image includes one or more recognized objects and determining, based on the audio data received using the audio input mode, whether the audio includes one or more recognized spoken words. The input mode is determined based on whether the image includes one or more recognized objects and whether the audio includes one or more recognized spoken words. For example, if the image includes one or more recognized objects and the audio does not include a spoken word, it's more likely the user is interested in the object(s) in the image and the image input mode can be selected. Similarly, if the audio includes one or more recognized spoken words and the image does not include a recognized object, it's more likely the user it interested in receiving content related to the spoken words.

If the image includes one or more recognized objects and the audio includes one or more spoken words that are related to the one or more recognized objects, the user may be asking a question about the recognized object(s) or specifying the content related to the object(s) that the user is seeking. If the image includes one or more recognized objects and the audio includes one or more spoken words that are related to the one or more recognized objects, a combination input mode that uses both the audio data and the pixel data can be selected for us in identifying content for presentation by the virtual assistant application.

Content is presented to a user of the mobile device (408). The presented content can be selected based on the input signal(s) received using the selected input mode. For example, if an audio input mode is selected, the content can be selected based on audio data for audio input (e.g., a transcription of the audio input). If an image input mode is selected, the content can be selected based on one or more objects recognized in pixel data for one or more images. If an image and audio input mode is selected, the content can be selected based on a combination of the image input and the audio input. The content can be selected by a remote system, e.g., a content distribution system, and sent to the mobile device for presentation.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array), an ASIC (application specific integrated circuit), or a GPGPU (General purpose graphics processing unit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by one or more data processing apparatus, the method comprising:
   receiving request data specifying a request to launch a virtual assistant application from a lock screen of a mobile device;
   in response to receiving the request data, obtaining a plurality of input signals, each of the input signals being of an input type different from each other input type of each other input signal, the input types for the input signals including an image type and an audio type;
   evaluating each of the plurality of input signals to respectively determine a plurality of confidence scores for a plurality of input modes corresponding to the plurality of input types;
   selecting, from the plurality of input modes, an input mode for the virtual assistant application based on the plurality of confidence scores generated for the plurality of input modes; and
   presenting, by the virtual assistant application, content to a user of the mobile device, the presented content being selected based on the input signal received using the selected input mode.

2. The method of claim 1, wherein evaluating each of the plurality of input signals to respectively determine the plurality of confidence scores comprises:
   determining, based at least in part on a first input signal of the image type of the plurality of input signals, wherein the first input signal of the image type is pixel data for an image captured by a camera of the mobile device, whether the image includes one or more objects;
   determining, based at least on the pixel data, that the one or more objects comprises one or more recognized objects of one more specified classes of objects;
   determining, based at least in part on a second input signal of the audio type of the plurality of input signals, wherein the second input signal of the audio type is audio data for audio input captured by a microphone of the mobile device, whether the audio data includes a query; and
   determining, based at least in part on the audio data and using a language model, a likelihood that the audio data includes the query.

3. The method of claim 1, further comprising transmitting, to a remote server, input of the plurality of input signals based upon the selected input mode;
   wherein the content presented to the user is received from the remote server based upon the transmitted input of the plurality of input signals.

4. The method of claim 1, further comprising selecting a user interface for presentation by the virtual assistant application based on the selected input mode, wherein the content is presented using the selected user interface.

5. The method of claim 1, wherein:
   obtaining a plurality of input signals comprises determining a location of the mobile device with respect to the user based on data received from one or more of an accelerometer of the mobile device or a gyroscope of the mobile device; and
   selecting, based on the plurality of confidence scores and from the plurality of input modes, an input mode for the virtual assistant application comprises selecting the input mode based on the plurality of confidence scores and the location of the mobile device with respect to the user.

6. The method of claim 2, wherein:
   obtaining a plurality of input signals comprises determining a direction in which the camera of the mobile device is pointing based on data received from one or more of an accelerometer of the mobile device or a gyroscope of the mobile device; and
   selecting, from the plurality of input modes, an input mode for the virtual assistant application comprises selecting the input mode based on the plurality of confidence scores and the direction in which the camera of the mobile device is pointing.

7. The method of claim 1, wherein:
obtaining one or more signals related to the inputs for the virtual assistant comprises obtaining geographic location data specifying a geographic location of the mobile device; and
selecting, from the plurality of input modes, an input mode for the virtual assistant application comprises selecting the input mode based on the plurality of confidence scores and the geographic location of the mobile device.

8. The method of claim 1, wherein selecting, from the plurality of input modes, an input mode for the virtual assistant application comprises determining whether a voice input includes a query and selecting an audio input mode in response to determining that the voice input includes the query.

9. The method of claim 1, wherein presenting, by the virtual assistant application, content to a user of the mobile device comprises at least one of presenting image content in a user interface of the virtual assistant application, presenting video content in the user interface of the virtual assistant application, or playing audio content.

10. A system comprising:
one or more data processing apparatus; and
a memory storage apparatus in data communication with the one or more data processing apparatus, the memory storage apparatus storing instructions executable by the one or more data processing apparatus and that upon such execution cause the one or more data processing apparatus to perform operations comprising:
receiving request data specifying a request to launch a virtual assistant application from a lock screen of a mobile device;
in response to receiving the request data, obtaining a plurality of input signals, each of the input signals being of an input type different from each other input type of each other input signal, the input types for the input signals including an image type and an audio type;
evaluating each of the plurality of input signals to respectively determine a plurality of confidence scores for a plurality of input modes corresponding to the plurality of input types;
selecting, from the plurality of input modes, an input mode for the virtual assistant application based on the plurality of confidence scores generated for the plurality of input modes; and
presenting, by the virtual assistant application, content to a user of the mobile device, the presented content being selected based on the input signal received using the selected input mode.

11. The system of claim 10, wherein evaluating each of the plurality of input signals to respectively determine the plurality of confidence scores comprises:
determining, based at least in part on a first input signal of the image type of the plurality of input signals, wherein the first input signal of the image type is pixel data for an image captured by a camera of the mobile device, whether the image includes one or more objects
determining, based at least on the pixel data, that the one or more objects comprises one or more recognized objects of one more specified classes of objects;
determining, based at least in part on a second input signal of the audio type of the plurality of input signals, wherein the second input signal of the audio type is audio data for audio input captured by a microphone of the mobile device, whether the audio data includes a query; and
determining, based at least in part on the audio data and using a language model, a likelihood that the audio data includes the query.

12. The system of claim 10, wherein the operations comprise transmitting, to a remote server, input of the plurality of input signals based upon the selected input mode;
wherein the content presented to the user is received from the remote server based upon the transmitted input of the plurality of input signals.

13. The system of claim 10, wherein the operations comprise selecting a user interface for presentation by the virtual assistant application based on the selected input mode, wherein the content is presented using the selected user interface.

14. The system of claim 10, wherein:
obtaining a plurality of input signals comprises determining a location of the mobile device with respect to the user based on data received from one or more of an accelerometer of the mobile device or a gyroscope of the mobile device; and
selecting, based on the plurality of confidence scores and from the plurality of input modes, an input mode for the virtual assistant application comprises selecting the input mode based on the plurality of confidence scores and the location of the mobile device with respect to the user.

15. The system of claim 11, wherein:
obtaining a plurality of input signals comprises determining a direction in which the camera of the mobile device is pointing based on data received from one or more of an accelerometer of the mobile device or a gyroscope of the mobile device; and
selecting, from the plurality of input modes, an input mode for the virtual assistant application comprises selecting the input mode based on the plurality of confidence scores and the direction in which the camera of the mobile device is pointing.

16. The system of claim 10, wherein:
obtaining one or more signals related to the inputs for the virtual assistant comprises obtaining geographic location data specifying a geographic location of the mobile device; and
selecting, from the plurality of input modes, an input mode for the virtual assistant application comprises selecting the input mode based on the plurality of confidence scores and the geographic location of the mobile device.

17. The system of claim 10, wherein selecting, from the plurality of input modes, an input mode for the virtual assistant application comprises determining whether a voice input includes a query and selecting an audio input mode in response to determining that the voice input includes the query.

18. The system of claim 10, wherein presenting, by the virtual assistant application, content to a user of the mobile device comprises at least one of presenting image content in a user interface of the virtual assistant application, presenting video content in the user interface of the virtual assistant application, or playing audio content.

19. A non-transitory computer storage medium encoded with a computer program, the program comprising instructions that when executed by data processing apparatus cause the data processing apparatus to perform operations comprising:

receiving request data specifying a request to launch a virtual assistant application from a lock screen of a mobile device;

in response to receiving the request data, obtaining a plurality of input signals, each of the input signals being of an input type different from each other input type of each other input signal, the input types for the input signals including an image type and an audio type;

evaluating each of the plurality of input signals to respectively determine a plurality of confidence scores for a plurality of input modes corresponding to the plurality of input types;

selecting, from the plurality of input modes, an input mode for the virtual assistant application based on the plurality of confidence scores generated for the plurality of input modes; and presenting, by the virtual assistant application, content to a user of the mobile device, the presented content being selected based on the input signal received using the selected input mode.

20. The non-transitory computer storage medium of claim 19, wherein evaluating each of the plurality of input signals to respectively determine the plurality of confidence scores comprises:

determining, based at least in part on a first input signal of the image type of the plurality of input signals, wherein the first input signal of the image type is pixel data for an image captured by a camera of the mobile device, whether the image includes one or more objects;

determining, based at least on the pixel data, that the one or more objects comprises one or more recognized objects of one more specified classes of objects;

determining, based at least in part on a second input signal of the audio type of the plurality of input signals, wherein the second input signal of the audio type is audio data for audio input captured by a microphone of the mobile device, whether the audio data includes a query; and determining, based at least in part on the audio data and using a language model, a likelihood that the audio data includes the query.

* * * * *